(12) United States Patent
Jordanger et al.

(10) Patent No.: US 7,113,759 B2
(45) Date of Patent: Sep. 26, 2006

(54) CONTROLLER AREA NETWORK TRANSCEIVER HAVING CAPACITIVE BALANCING CIRCUIT FOR IMPROVED RECEIVER COMMON-MODE REJECTION

(75) Inventors: Ricky D. Jordanger, Allen, TX (US); Anton M. Antonsen, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 437 days.

(21) Appl. No.: 10/229,516

(22) Filed: Aug. 28, 2002

(65) Prior Publication Data

US 2004/0043739 A1    Mar. 4, 2004

(51) Int. Cl.
*H04B 1/18*    (2006.01)

(52) U.S. Cl. .................. 455/281; 455/127.5; 333/124

(58) Field of Classification Search .................. 455/73, 455/80, 107, 280, 281, 127.1, 127.5, 131; 333/17.3, 124
See application file for complete search history.

(56) References Cited

U.S. PATENT DOCUMENTS

| | | | | |
|---|---|---|---|---|
| 4,356,458 | A | * | 10/1982 | Armitage .................... 333/17.3 |
| 5,375,256 | A | * | 12/1994 | Yokoyama et al. ........... 455/80 |
| 5,654,679 | A | * | 8/1997 | Mavretic et al. ........... 333/17.3 |
| 5,710,984 | A | * | 1/1998 | Millar et al. .................. 455/80 |
| 6,111,888 | A | | 8/2000 | Green et al. |
| 6,324,044 | B1 | | 11/2001 | Teggatz et al. |
| 6,756,858 | B1 | * | 6/2004 | Gonzalez et al. .......... 333/17.3 |
| 2002/0145483 | A1 | * | 10/2002 | Bouisse ..................... 333/17.3 |

* cited by examiner

*Primary Examiner*—Nguyen T. Vo
*Assistant Examiner*—Nhan T. Le
(74) *Attorney, Agent, or Firm*—W. James Brady, III; Frederick J. Telecky, Jr.

(57) ABSTRACT

A controller area network transceiver and a transmission method for a controller area network provides improved symmetry between its differential output signal CANH and CANL such that capacitive imbalance is minimized. The transceiver disclosed herein includes a driver including a non-inverted output that couples to the first output terminal CANH and a inverted output that couples to the second output terminal CANL. A receiver comparator includes a non-inverted input coupled to the first output terminal CANH and a inverted input coupled to the second output terminal CANL. A first and second impedance matching circuit portions capacitively balance the first and second output terminals such that efficient common-mode rejection is enabled by setting the RC time constants formed by each impedance matching circuit and external resistances to be substantially equivalent. This transceiver provides a high performance, simple, and cost effective design which eliminates capacitive imbalance while decreasing required die area.

6 Claims, 6 Drawing Sheets

CONTROLLER AREA NETWORK TRANSCEIVER HAVING CAPACITIVE BALANCING CIRCUIT FOR IMPROVED RECEIVER COMMON-MODE REJECTION

FIELD OF THE INVENTION

The present invention relates to controller area network transceivers and, more particularly, to a controller area network transceiver having a capacitive balancing circuit for superior receiver common-mode rejection.

BACKGROUND OF THE INVENTION

Figure 1:
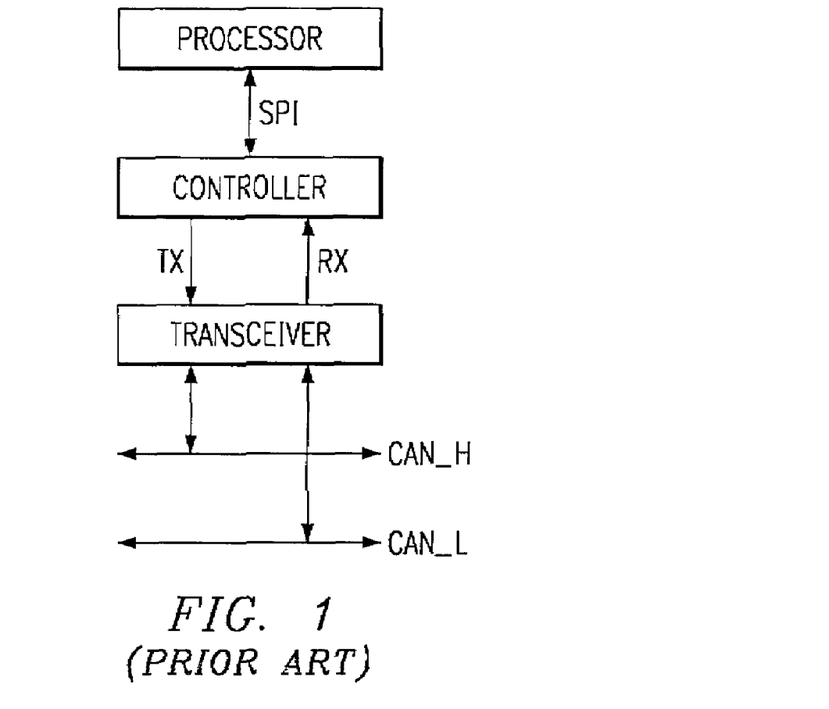
FIG. 1 illustrates a known structure of a controller area network (CAN)
Figure 2:
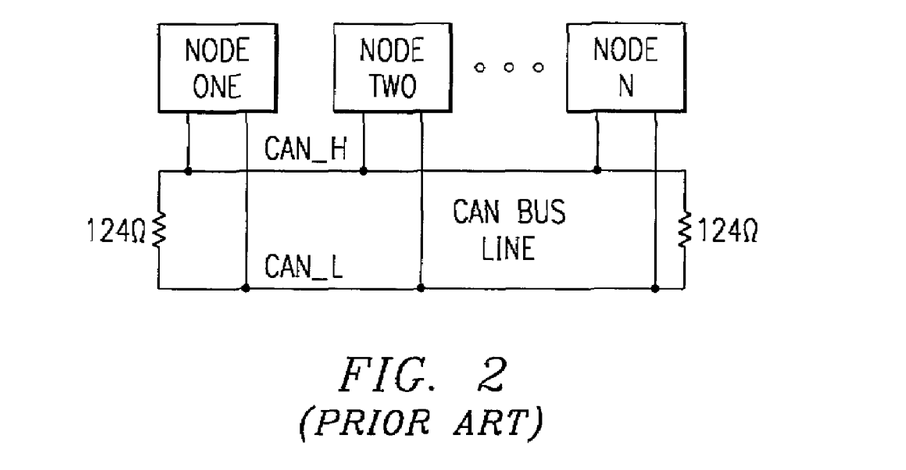
FIG. 2 displays a known CAN bus having a multipoint topology.

A controller area network (CAN) bus, such as that compliant with the ISO 11898 standard, is used in several systems including industrial, automotive, robotic, and motor control systems to provide a serial communication physical layer. The robust CAN bus provides low power requirements, space savings and reduced resources. As shown in FIG. 1, a CAN node is comprised of three basic parts: a processor, a network controller, and a transceiver. The transceiver interfaces the single-ended CAN controller with the differential CAN bus. The bus, as shown in FIG. 2, includes multiple nodes that transmit messages on-demand by any node whenever the bus is free. The transceiver broadcasts data such that all nodes receive each message sent on the bus, including the node that sent it. The effect of broadcasting of data allows multiple nodes to utilize the data transmitted.

Figure 3A:
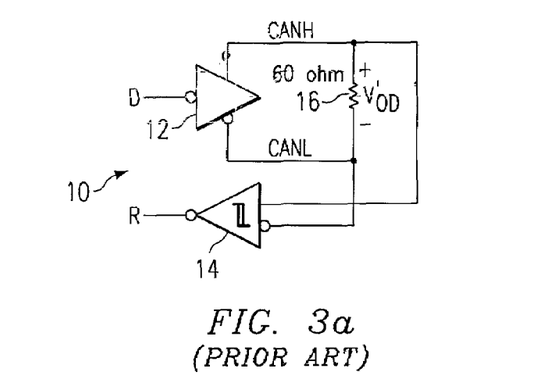
FIGS. 3a and 3b illustrate a known CAN transceiver architecture and signal characteristics, respectively.

Texas Instruments, Inc. ® has introduced CAN transceiver models: SN65HVD230, SN65HVD231, and SN65HVD232, for use in applications employing the CAN serial communication physical layer compatible with the ISO 11898 Standard. As a CAN transceiver, as shown in FIG. 3a, each model provides differential transmit capability to the bus and differential receive capability to a CAN controller at speeds of up to 1 Mbps. Designed for operation in especially harsh environments, the CAN transceiver features cross-wire, over voltage and loss of ground protection from −4 V to +16 V, over-temperature protection as well as −2 V to 7 V common-mode range, and withstands transients of ±25 V.

Figure 3B:
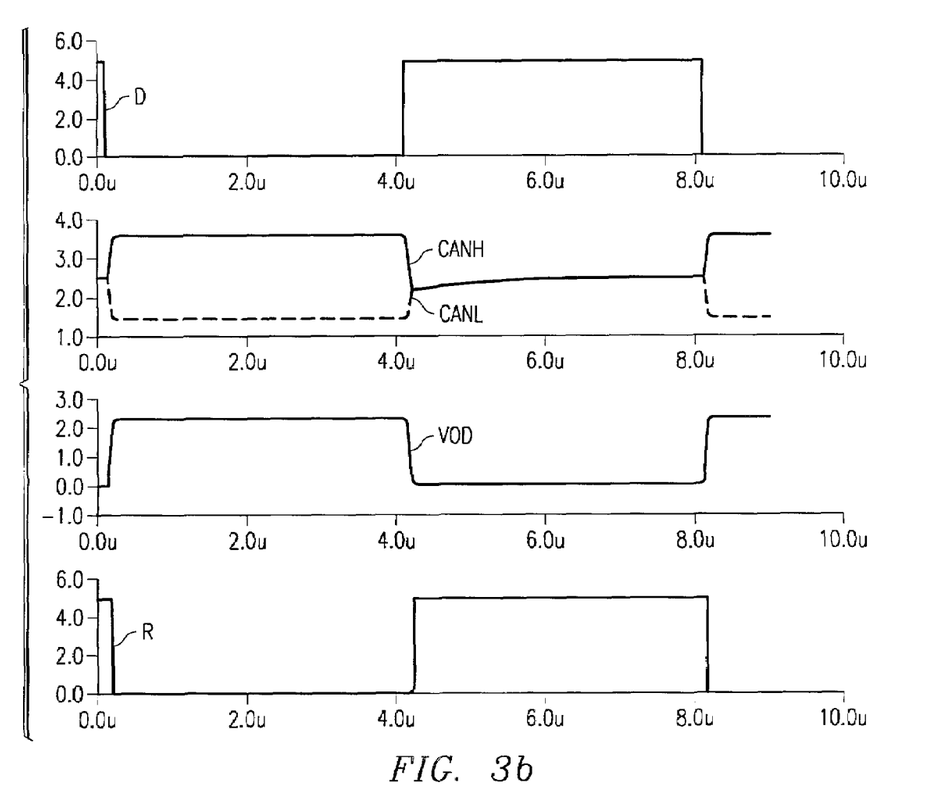

FIG. 3b represents the timing diagrams of several signals including the signals found at driver node D, receiver node R, differential nodes, CANH and CANL, and voltage output differential $V_{od}$ of CAN transceiver 10. As shown, when the driver input D is low, the differential output nodes, CANH and CANL, are high and low respectively. When the driver input D is high, however, transceiver 10 goes into a tri-state mode where the differential output nodes, CANH and CANL, are both tri-state.

In general, the input capacitance of the receiver comparator 14 is capacitively balanced without any added circuitry if the transistors that form the input differential pair within the receiver comparator 14 are made the same size. Conventionally, these transistors are made the same size. Driver 12, however, includes driver outputs that tend to be the source of capacitive imbalance on the receiver input pins.

To correct this capacitive imbalance, additional impedance balancing circuitry must be added to the differential nodes, CANH and CANL, in compliance with the ISO 11898 physical layer standard. Driver arbitration problems arise when one driver on the bus is trying to pull a bus line low while another driver is trying to the pull the same bus line high. The ISO 11898 physical layer standard avoids driver arbitration problems by requiring that only an active pull-up device may be connected to the CANH node and only an active pull-down device may be connected to the CANL node.

Figure 4:
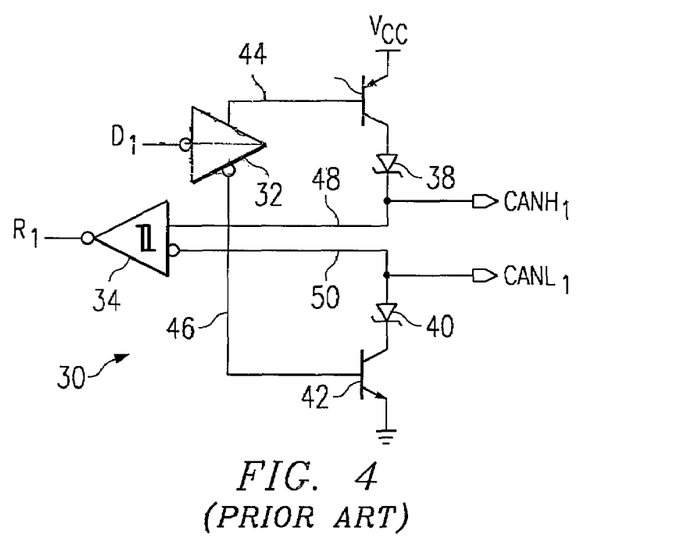
FIG. 4 shows an existing CAN transceiver architecture.

A known CAN transceiver compliant with ISO 11898 physical layer standard, as shown in FIG. 4, includes impedance matching circuitry formed using bipolar transistors, 36 and 42, and blocking Schottky diodes, 38 and 40 connected as shown. Differential node $CANH_1$ uses a PNP (or PMOS) transistor 36 as an active device, while differential node $CANL_1$ uses a NPN (or an NMOS) transistor 40 as an active device. A disadvantage of this design is that the upper PNP transistor 36 connected to node $CANH_1$ must be substantially larger than the lower NPN transistor 42 connected to node $CANL_1$ to meet output differential voltage requirements of the ISO11898 standard. Since upper PNP transistor 36 has more capacitance than the lower NPN transistor 42 and the driver outputs, 44 and 46, are indirectly connected in parallel to the receiver inputs, $CANH_1$ and $CANL_1$, through transistors, 36 and 42, capacitive imbalance still exists on the receiver inputs, $CANH_1$ and $CANL_1$. Conventionally, the $CANH_1$ node will have a capacitance of 18 pF while the $CANL_1$ node will have a capacitance of 7 pF, leaving a difference of 11 pF.

Furthermore, capacitive imbalance presents another problem in that it prevents the transceiver from passing a common mode rejection test which is conducted in an effort to make certain that the impedance matching circuitry guards the receiver against common-mode transients such as noise which causes the differential output nodes, $CANH_1$ and $CANL_1$, to be pulled higher than the power supply rail voltage $V_{CC}$ or lower than ground.

Figure 5A:
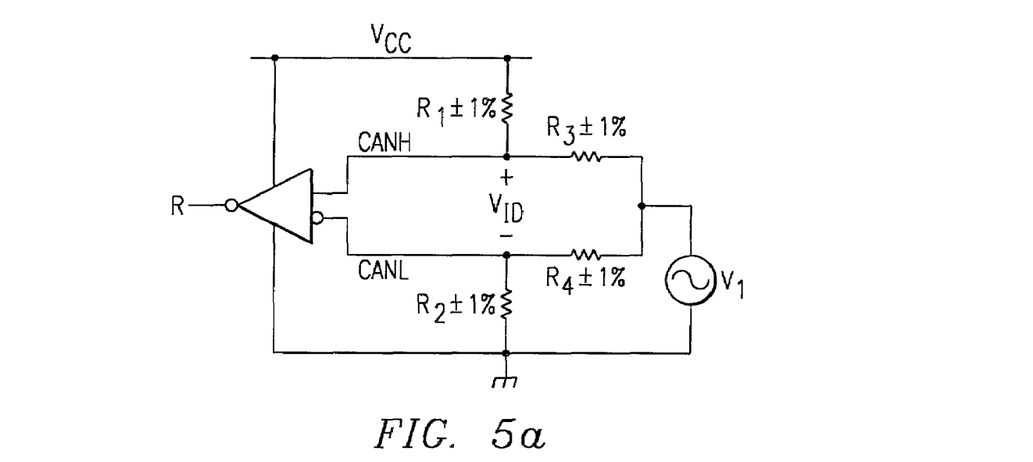
FIG. 5a illustrates the test implementation for receiver input common-mode input voltage rejection test.

Given a common-mode rejection test implementation, as shown in FIG. 5a, if during the application of the input differential voltage to the differential output nodes, $CANH_1$ and $CANL_1$, the receiver output node $R_1$ experiences a change of state from low to high when it should remain low, then transceiver 30 has failed the common-mode rejection test. If, however, during application of the differential applied voltage, the receiver output node $R_1$ remains low or does not experience a change of state, then transceiver 30 has passed the common-mode rejection test. Failure of the common-mode rejection test stems from the difference between the RC time constant of differential output nodes, CANH and CANL.

Figure 6:
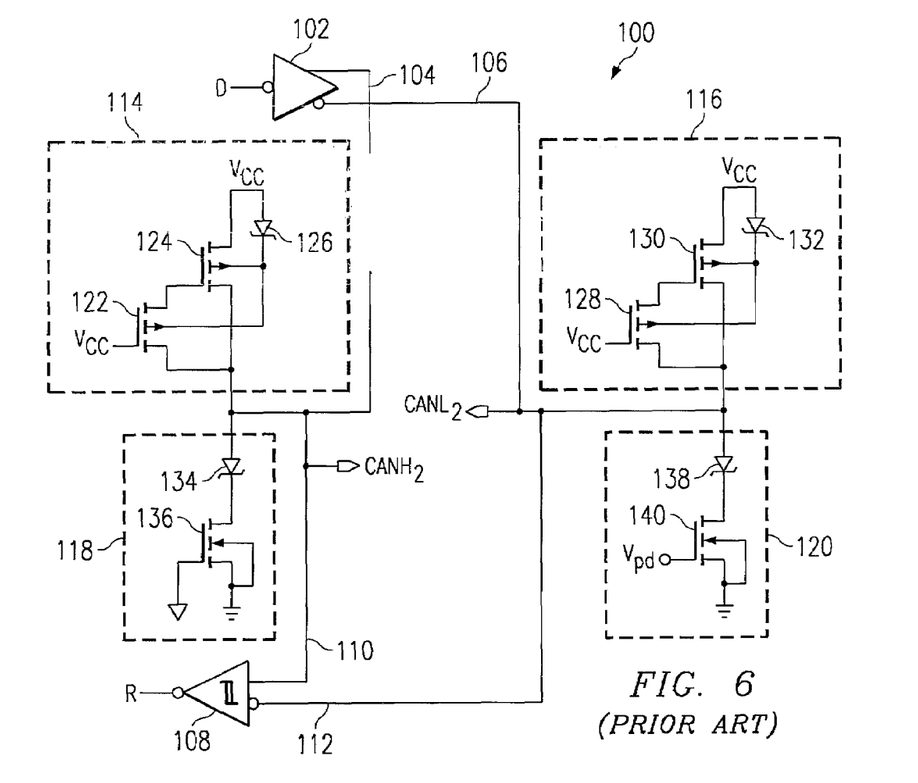
FIG. 6 displays a known CAN transceiver architecture.

Conforming with ISO11898 requirements, FIG. 6 illustrates another approach to eliminate the capacitive imbalance in a transceiver architecture. As shown, driver 102 includes outputs, 104 and 106, couples to nodes, $CANH_2$ and $CANL_2$, respectively. Circuits 114 and 120 serve as active devices for transceiver 100. Circuit 114 includes transistor 122 having a gate coupled to power supply $V_{CC}$, a drain coupled to the gate of transistor 124 and a source coupled to node $CANH_2$. Transistor 124 includes a drain coupled to the power supply $V_{CC}$ and a source couple to node $CANH_2$. Schottky diode 126 couples between power supply $V_{CC}$ and bulk nodes of transistors, 122 and 124. Circuit 120 includes transistor 140 having a gate coupled to power supply $V_{CC}$, a drain coupled to a Schottky diode 138, a source coupled to ground and a bulk coupled to the source. Schottky diode 138 couples between node $CANL_2$ and the drain of transistor 140. Redundancy through circuits, 116 and 118, is incorporated within this design to correct any capacitive imbalance, such that circuit 116 is a replica of circuit 114 and circuit 118 is a replica of circuit 120.

Dummy devices, 116 and 118, are placed on nodes $CANH_2$ and $CANL_2$ to mimic the capacitance of the active driver on the corresponding node opposite each respective node. Thereby, differential output nodes $CANH_2$ and $CANL_2$ are capacitively balanced. The disadvantage of this architecture is that the dummy devices, 116 and 118, are designed to be as large as the active devices, 114 and 120, to perfectly balance the receiver input capacitance. The capacitance, however, does not need to be perfectly balanced; rather, the RC time constant is formed by external resistors in a receiver common-mode rejection test implementation and the capacitance of nodes, $CANH_2$ and $CANL_2$, must be balanced.

Furthermore, in order to remain price competitive, minimization of the CAN transceiver die size is an important design criteria. Removing dummy devices, 116 and 118, from the CAN transceiver architecture would suffice to lower die area and would not result in any performance drawbacks; however, it will cause transceiver 100 to fail common-mode rejection test.

Therefore, a need exists for a CAN transceiver that provides improved impedance matching between differential output signals, CANH and CANL, while the requirements of die area are decreased. The impedance matching circuit portions must connect to differential output nodes, CANH and CANL, and capacitively balanced differential output nodes, CANH and CANL, such that the RC time constants formed with external test resistors are equivalent. As a result, the improved transceiver must provide superior common-mode rejection, passing the aforementioned common-mode rejection test.

SUMMARY OF THE INVENTION

To address the above-discussed deficiencies of CAN transceiver, the present invention teaches a CAN transceiver that eliminates capacitive imbalance within transceiver terminals CANH and CANL while preserving the space requirement on the die to a minimum. This CAN transceiver includes impedance matching sufficient to warrant a 100% pass rate during the common-mode rejection test, rendering superior common-mode rejection. A transceiver in accordance with the present invention includes a driver, having an input, a non-inverted and an inverted output, to generate a first and second output signal at the respective non-inverted and inverted outputs. The non-inverted output couples to the first output terminal CANH and the inverted output couples to the second output terminal CANL. A receiver comparator includes a non-inverted input coupled to the first output terminal and a inverted input coupled to the second output terminal.

A first and second impedance matching circuit portion capacitively balance the first and second output terminals such that efficient common-mode rejection is enabled. The first impedance matching circuit portion couples between the non-inverted output of the driver and the non-inverted input of the receiver comparator to receive the first output signal. This first impedance matching circuit portion provides a first capacitance at the first output terminal CANH. Under common-mode rejection testing, the first impedance matching circuit portion connects with a first external resistor to supply a first RC time constant. The second impedance matching circuit portion couples between the inverted output of the driver and the inverted input of the receiver comparator to receive the second output signal. This second impedance matching circuit portion provides a second capacitance at the first output terminal CANL. Under common-mode rejection testing, the second impedance matching circuit portion connects with a second external resistor to supply a second RC time constant. The first and second impedance matching circuit portions are designed such that the first and second capacitance are substantially equivalent. As a result, the first and second RC time constants are substantially equivalent, rendering superior common-mode rejection.

Advantages of this design include but are not limited to a CAN transceiver having a high performance, simple, and cost effective design which eliminate capacitive imbalance to provide superior common-mode rejection.

BRIEF DESCRIPTION OF THE DRAWINGS

For a more complete understanding of the present invention and the advantages thereof, reference is now made to the following description taken in conjunction with the accompanying drawing in which like reference numbers indicate like features and wherein.

DETAILED DESCRIPTION OF PREFERRED EMBODIMENTS

The present invention is best understood by comparison with the prior art. Hence, this detailed description begins with a discussion of known CAN transceiver 30 as shown in FIG. 4 and the common-mode rejection test as applied to this CAN transceiver. As described known CAN transceiver, as shown in FIG. 4, includes impedance matching circuitry formed using bipolar transistors, 36 and 42, and blocking Schottky diodes, 38 and 40 connected as shown. Transceiver 30 has a capacitive imbalance since upper PNP transistor 36 has more capacitance than the lower NPN transistor 42.

As explained, capacitive imbalance leads to failure of the common mode rejection test which is conducted in an effort to make certain that the impedance matching circuitry guards the receiver against common-mode transients such as noise which causes the differential output nodes $CANH_1$ and $CANL_1$ to be pulled higher than the power supply rail voltage or lower than ground.

A particular approach to common-mode rejection testing is shown in FIG. 5a. The input offset voltage of a CAN receiver is typically 700 mV. Thus, guaranteed trip points are exhibited when the input differential voltage $V_{id}$ is less than or equal to 500 mV, forcing the receiver output R high, and when the input differential voltage $V_{id}$ is greater than or equal to 900 mV, forcing receiver output R low. To ensure that the receiver 34 is tested for common-mode signal rejection exactly at these guaranteed trip points, external resistors, $R_1$ and $R_2$, bias the receiver inputs to either 500 or 900 mV while the common-mode signal $V_1$ is injected between the resistors, $R_3$ and $R_4$.

Figure 5B:
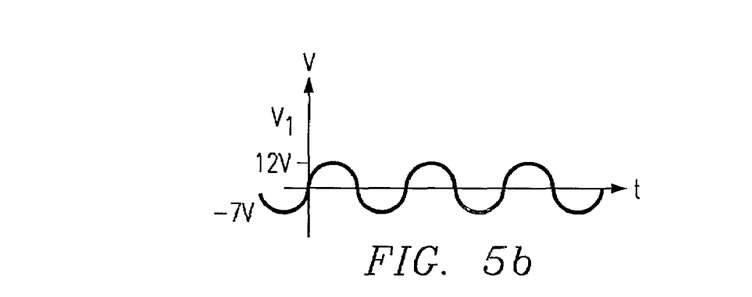
FIG. 5b displays the common-mode input signal $V_1$.

To implement this particular testing scheme, resistors, $R_1$ and $R_2$, are of the same value, 450Ω, while resistors, $R_3$ and $R_4$, are 50Ω for the purpose of biasing input differential voltage $V_{id}$ equal to 500 mV. In contrast, resistors, $R_1$ and $R_2$, are 227Ω and resistors, $R_3$ and $R_4$, are 50Ω for the purpose of biasing input differential voltage $V_{id}$ equal to 900 mV. The common-mode signal $V_1$ may be an alternating voltage such as the sine wave shown in FIG. 5b which extends from approximately −7 V to 12 V. All input signals of the input differential voltage $V_{id}$ may be supplied by a generator similar to the sine wave shown in FIG. 5b having a frequency of less than or equal to 1.5 MHz.

If during the application of the input differential voltage $V_{id}$, output R experiences a change of state from low to high when it should remain low, then the transceiver has failed the common-mode test. If, however, during application of the differential applied voltage $V_{id}$, output R remains low or does not experience a change of state, then the transceiver has passed the common-mode test.

Figure 8A:
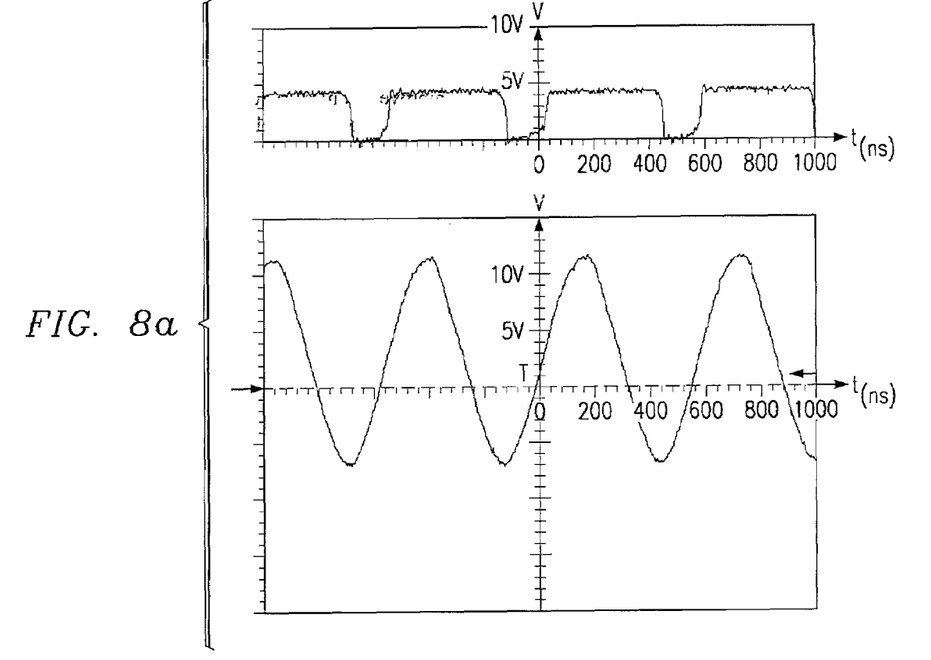
FIG. 8a shows the timing diagram for the tests results of the 900 mV input differential signal on the known CAN transceiver architecture.
Figure 8B:
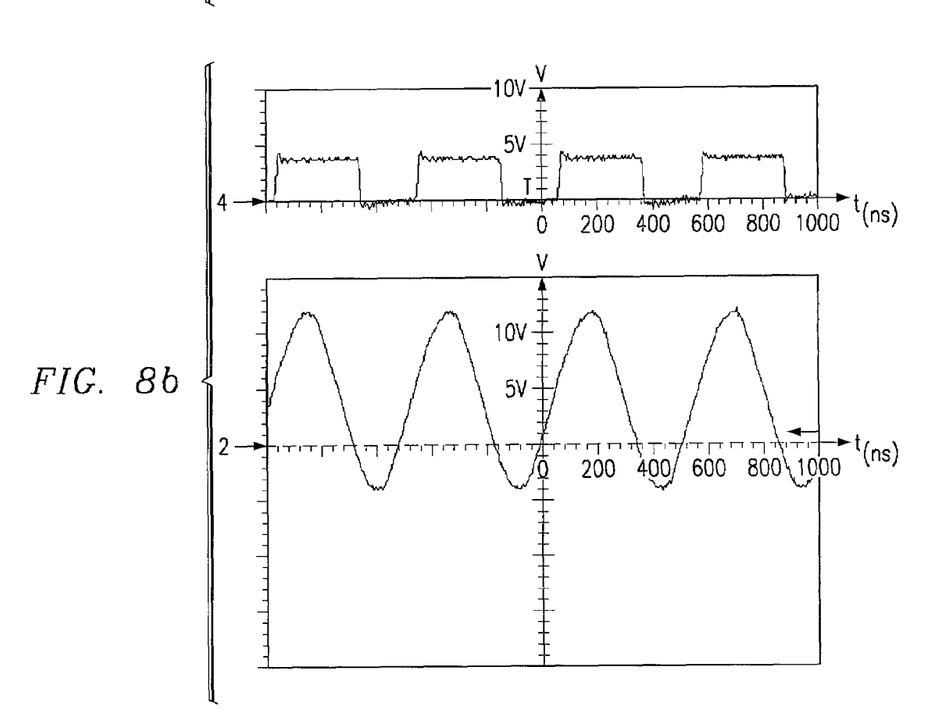
FIG. 8b displays the timing diagram for the tests results of the 500 mV input differential signal on the known CAN transceiver architecture.

As shown in FIGS. 8a and 8b, CAN transceiver 30 of FIG. 4 fails the common-mode rejection test when the input differential voltage $V_{id}$ is 500 mV and 900 mV, respectively. In FIG. 8a, receiver node R should have remained low yet it spiked high for a short period of time. In FIG. 8b, receiver node R should have remained high yet it spiked low for a short period of time. Both transitions are indications of failure of the common-mode rejection test.

Failure of the common-mode rejection test stems from the difference between the RC time constant of nodes, CANH and CANL. This RC time constant is formed by external resistors, $R_1$ and $R_2$, and the device node capacitance of nodes CANH and CANL. The difference between the RC time constants of differential nodes, CANH and CANL, causes a slow down in the common-mode input signal $V_1$ that is greater on one node versus the other. As a result, the input differential voltage $V_{id}$ shrinks or expands which may lead to data errors if the input differential voltage $V_{id}$ changes for a substantial amount of time.

Figure 7:
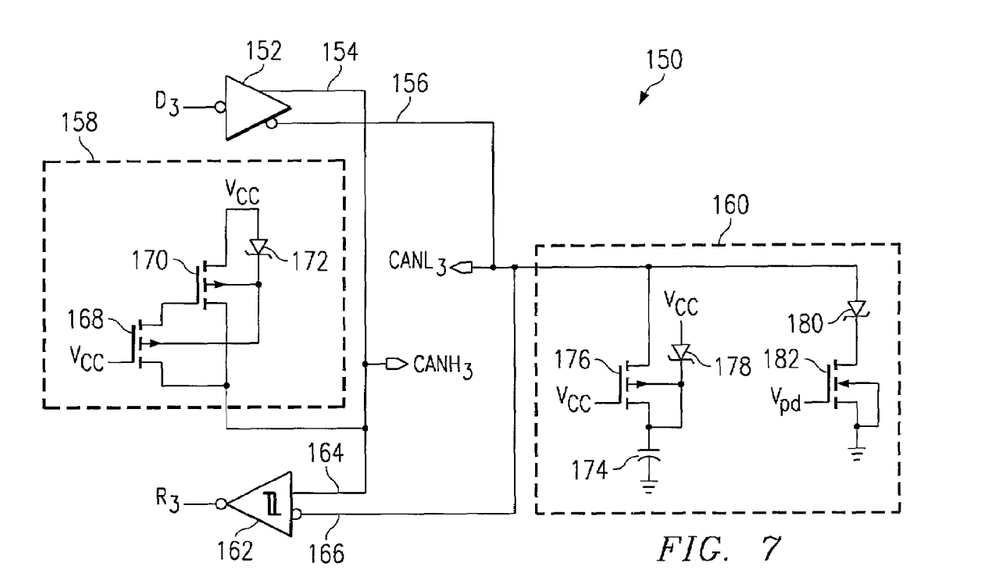
FIG. 7 illustrates a CAN transceiver architecture in accordance with the present invention.

To address the deficiencies of known CAN transceivers, the CAN transceiver 150 in accordance with the present invention, shown in FIG. 7, provides impedance matching between differential output signals, $CANH_3$ and $CANL_3$, while the requirements of die area are decreased. Driver 152 includes input $D_3$ and differential outputs, 154 and 156, couples to nodes, $CANH_3$ and $CANL_3$, respectively. Circuits 158 and 160 serve as active devices or impedance matching circuits for each terminal node $CANH_3$ and $CANL_3$, respectively. Circuit 158 couples between the non-inverting output 154 of driver 152 and the non-inverting input 164 of receiver comparator 162. Circuit 158 includes transistor 168 having a gate coupled to power supply $V_{CC}$, a drain coupled to the gate of transistor 170 and a source coupled to node $CANH_3$. Transistor 170 includes a drain coupled to the power supply $V_{CC}$ and a source couple to node $CANH_3$. Schottky diode 172 couples between power supply $V_{CC}$ and bulk nodes of transistors, 168 and 170. Circuit 160 couples between the inverting output 156 of driver 152 and the inverting input 166 of receiver comparator 162. Circuit 160 includes transistor 182 having a gate coupled to a pre-drive signal $V_{pd}$, a drain coupled to a first Schottky diode 180, a source coupled to ground and a bulk coupled to the source. Schottky diode 180 couples between node $CANL_3$ and the drain of transistor 182. A second transistor 176 includes a gate coupled to power supply $V_{CC}$, a drain coupled to node $CANL_3$. A Schottky diode 178 couples between the power supply $V_{CC}$ and the bulk and source of transistor 176. A capacitor 174 couples between the source of transistor 176 and ground.

In operation the gate of transistor 170 is pulled low to turn transistor 170 on and pull differential output node $CANH_3$ high, approximately the power supply voltage $V_{CC}$. When the gate of transistor 182 is high, the differential output node $CANL_3$ is pulled low, approximately ground. Conversely, when the gate of transistor 170 is high, transistor 170 turns off, pulling differential output node $CANH_3$ into a tri-state. Accordingly, when the gate of transistor 182 is low, transistor 182 is turned off, pulling differential output node $CANL_3$ into tri-state. Transistor 168 prevents reverse conduction of transistor 170 in the case where node $CANH_3$ is pulled to a voltage higher than power supply voltage $V_{CC}$. In this scenario, transistor 168 pulls the gate of transistor 170 to the same voltage of the drain of transistor 170 to effectively short the transistor 170 when the voltage applied to node $CANH_3$ is greater than the power supply voltage $V_{CC}$. Whenever differential output node $CANL_3$ is above power supply voltage $V_{CC}$, transistor 176 turns on to enable current to flow across capacitor $C_1$.

Transceiver 150 provides a low die area solution that passes the common-mode rejection test. A simple but effective capacitance balance is achieved by adding PMOS transistor 176 with backgate blocking diode 178 and capacitor 174. Theses additional elements balance out the capacitance between nodes, $CANH_3$ and $CANL_3$, by allowing extra capacitance to be seen by the $CANL_3$ pin when its potential is a threshold voltage $V_t$ above power supply voltage $V_{CC}$. Accordingly, the impedance matching circuit 160 mimics the capacitance seen on node $CANH_3$ when its potential is a threshold voltage $V_t$ above power supply voltage $V_{CC}$. Although the impedance matching circuit 160 does not perfectly balance the capacitance between nodes, $CANH_3$ and $CANL_3$, it provides sufficient capacitive balancing requiring less die area to achieve superior common-mode rejection. Simulations across common mode range of −7 to +12 V reveal the capacitance of the $CANH_3$ and $CANL_3$ pins are balanced within 10 pF.

Figure 9A:
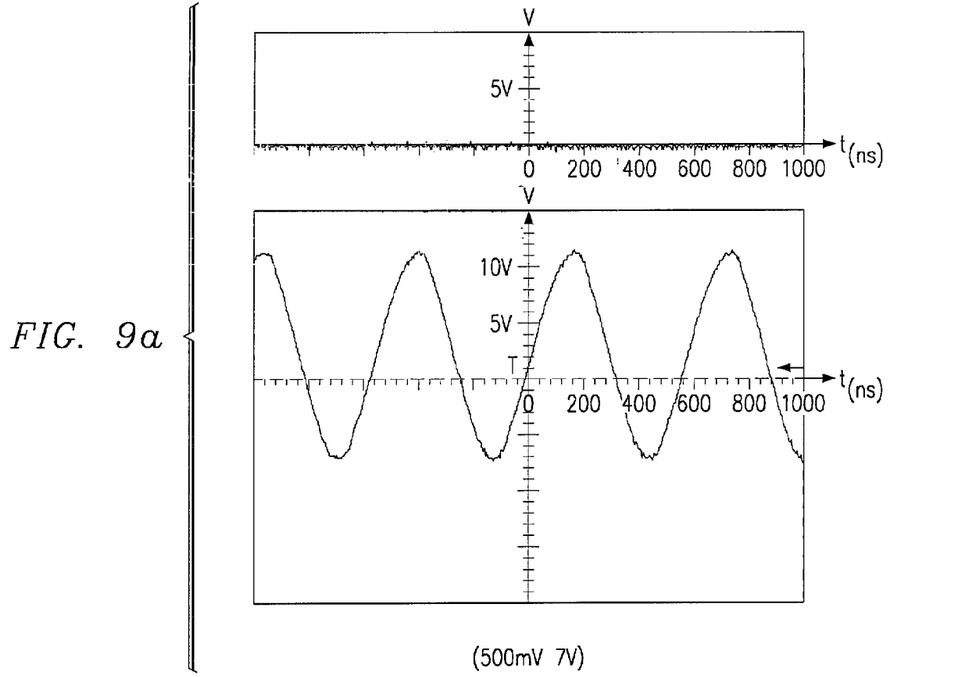
FIG. 9a shows the timing diagram for the tests results of the 900 mV input differential signal on the CAN transceiver architecture in accordance with the present invention.
Figure 9B:
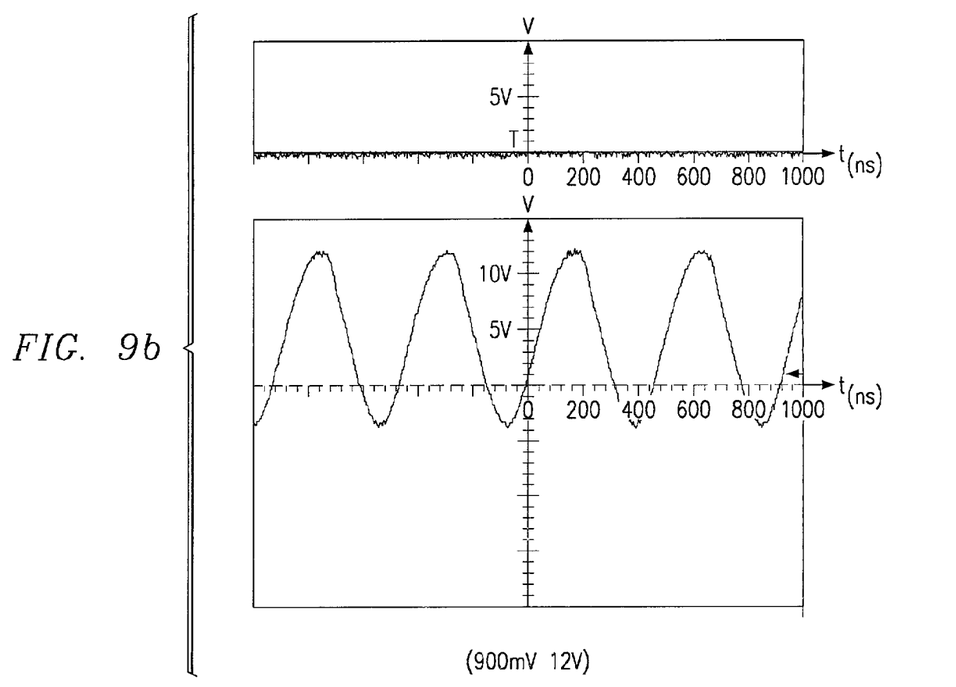
FIG. 9b displays the timing diagram for the tests results of the 500 mV input differential signal on the CAN transceiver architecture in accordance with the present invention.

The new architecture passes the receiver common-mode rejection test as shown in FIGS. 9a and 9b. FIGS. 9a and 9b illustrate that the CAN transceiver architecture in accordance with the present invention passes the common-mode rejection test when the input differential voltage $V_{id}$ is 500 mV and 900 mV, respectively. As displayed, during application of the differential applied voltage $V_{id}$, output $R_4$ remains low or does not experience a change of state. Thereby, the transceiver has passed the common-mode test.

This architecture presents a size savings of approximately 10% over the capacitively balanced architecture shown in FIG. 6. Thereby, the transceiver in accordance with the present invention gives a cost and performance advantage over other known alternate architectures.

Advantages of this design include but are not limited to a CAN transceiver having a high performance, simple, and cost effective design that eliminates capacitive imbalance to provide superior common-mode rejection.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

We claimed:

1. A controller area network transceiver including a power supply rail, a first and a second output terminal, comprising:
   a driver, having an input, a non-inverted and an inverted output, to generate a first and second output signal at the respective non-inverted and inverted outputs, the non-inverted output coupled to the first output terminal, the inverted output coupled to the second output terminal;
   a receiver comparator having a non-inverted and an inverted input and an output, the non-inverted input coupled to the first output terminal, the inverted input coupled to the second output terminal;
   a first impedance matching circuit portion coupled between the non-inverted output of the driver and the non-inverted input of the receiver comparator to receive the first output signal and to provide a first capacitance at the first output terminal; and
   a second impedance matching circuit portion coupled between the inverted output of the driver and the inverted input of the receiver comparator to receive the second output signal and to provide a second capacitance at the second output terminal, the first and second impedance matching circuit portions capacitively balance the first and second output terminals such that the first capacitance substantially equals the second capacitance to enable receiver common-mode rejection,
   wherein the second impedance matching circuit portion comprises:
   a first transistor having a bulk, a gate, a drain and a source, the gate coupled to the power supply rail, a drain coupled to receive the second output signal;
   a first diode coupled between the power supply rail and the bulk of the first transistor;
   a capacitor coupled between the source of the first transistor and ground; a second diode coupled to receive the second output signal; and
   a second transistor having a bulk, a gate, a drain and a source, the gate coupled to receive a pre-drive signal, the drain coupled to the second diode, the source and bulk coupled to ground.

2. A controller area network transceiver as recited in claim 1, wherein the first diode is a Schottky diode.

3. A controller area network transceiver as recited in claim 1, wherein the second diode is a Schottky diode.

4. A controller area network transceiver including a power supply rail, a first and a second output terminal, comprising:
   a driver, having an input, a non-inverted and an inverted output, to generate a first and second output signal at the respective non-inverted and inverted outputs, the non-inverted output coupled to the first output terminal, the inverted output coupled to the second output terminal;
   a receiver comparator having a non-inverted and an inverted input and an output, the non-inverted input coupled to the first output terminal, the inverted input coupled to the second output terminal;
   a first impedance matching circuit portion coupled between the non-inverted output of the driver and the non-inverted input of the receiver comparator to receive the first output signal, the first impedance matching circuit portion configured such that when receiver common-mode rejection testing occurs, the first impedance matching circuit portion couples to a first external resistor to form a first RC time constant; and
   a second impedance matching circuit portion coupled between the inverted output of the driver and the inverted input of the receiver comparator to receive the second output signal, the second impedance matching circuit portion configured such that when receiver common-mode rejection testing occurs, the second impedance matching circuit portion couples to a second external resistor to form a second RC time constant, the first and second impedance matching circuit portions capacitively balance the first and second output terminals such that the first RC time constant substantially equals the second RC time constant to enable receiver common-mode rejection,
   wherein the second impedance matching circuit portion comprises:
   a first transistor having a bulk, a gate, a drain and a source, the gate coupled to the power supply rail, a drain coupled to receive the second output signal;
   a first diode coupled between the power supply rail and the bulk of the first transistor;
   a capacitor coupled between the source of the first transistor and ground;
   a second diode coupled to receive the second output signal; and
   a second transistor having a bulk, a gate, a drain and a source, the gate coupled to receive a pre-drive signal, the drain coupled to the second diode, the source and bulk coupled to ground.

5. A controller area network transceiver as recited in claim 4, wherein the first diode is a Schottky diode.

6. A controller area network transceiver as recited in claim 4, wherein the second diode is a Schottky diode.

* * * * *